United States Patent
Patkar et al.

(10) Patent No.: US 6,643,726 B1
(45) Date of Patent: Nov. 4, 2003

(54) METHOD OF MANUFACTURE AND APPARATUS OF AN INTEGRATED COMPUTING SYSTEM

(75) Inventors: Niteen Patkar, Sunnyvale, CA (US); Ali Alasti, Los Altos, CA (US); Don Van Dyke, Pleasanton, CA (US); Korbin Van Dyke, Sunol, CA (US); Shalesh Thusoo, Milpitas, CA (US); Stephen C. Purcell, Mountain View, CA (US); Govind Malalur, Fremont, CA (US)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/376,820

(22) Filed: Aug. 18, 1999

(51) Int. Cl.$^7$ .............................................. G06F 13/36
(52) U.S. Cl. ...................................................... 710/306
(58) Field of Search .......................... 711/207; 710/100, 710/104, 105, 305–315

(56) References Cited

U.S. PATENT DOCUMENTS

| | | | | |
|---|---|---|---|---|
| 4,594,651 A | * | 6/1986 | Jaswa et al. ................ 700/2 |
| 5,634,034 A | * | 5/1997 | Foster .......................... 711/147 |
| 6,263,390 B1 | * | 7/2001 | Alasti et al. ..................... 710/1 |
| 6,301,648 B1 | * | 10/2001 | Campbell ..................... 711/207 |
| 6,321,314 B1 | * | 11/2001 | Van Dyke .................... 711/163 |
| 6,324,635 B1 | * | 11/2001 | Van Dyke et al. .......... 711/207 |
| 6,327,607 B1 | * | 12/2001 | Fant ............................. 709/106 |
| 6,332,184 B1 | * | 12/2001 | Campbell ..................... 711/153 |
| 6,449,671 B1 | * | 9/2002 | Patkar et al. ................ 710/107 |

* cited by examiner

Primary Examiner—Paul R. Myers
(74) Attorney, Agent, or Firm—Vedder, Price, Kaufman & Kammholz, P.C.

(57) ABSTRACT

An integrated computing system includes at least one processor formed on a substrate, wherein the processor operates at a processor rate. The integrated computing system further includes a global bus that is coupled to the at least one processor and is formed on the substrate. The global bus supports transactions (e.g., data, operational instructions, and/or control signaling conveyances) at a rate that is equal to or greater than the processing rate. The integrated computing system further includes a device gateway and memory gateway that are operably coupled to the global bus and formed on the substrate. The device gateway provides an interface for at least one device (e.g., internal or external) to the global bus. The memory gateway provides an interface between the global bus and memory.

14 Claims, 4 Drawing Sheets

FIG 1

METHOD OF MANUFACTURE AND APPARATUS OF AN INTEGRATED COMPUTING SYSTEM

TECHNICAL FIELD OF THE INVENTION

This invention relates generally to computer system architectures and more particularly to an integrated computing system.

BACKGROUND OF THE INVENTION

FIG. 4 illustrates a schematic block diagram of a known computing system. As shown, the computing system includes components within a chassis, i.e., the hardware box, and external devices. As shown, the external devices include speakers, a monitor, external peripheral devices such as printers, memory backups, etc. Within the chassis, the computer system includes a motherboard, memory, internal peripheral devices, video graphics circuitry, and audio processing circuitry. The internal peripheral devices include modems, network cards, etc. The motherboard includes a central processing unit (CPU), cache memory, a chip set, and may further include a portion of memory. Such a portion of memory may be read/write memory and/or ROM memory. The memory contained within the chassis is typically hard drive memory, floppy disk memory, CD memory and/or zip drive memory.

In operation, the central processing unit executes applications (e.g., word applications, drawing applications, etc.) and interfaces with the other devices of the computing system to provide the user with appropriate feedback regarding the execution of the application. As such the central processing unit communicates with the peripheral devices, the video graphics circuitry, and audio processing circuitry via the chip set. As is known, video graphics data received by the video graphics circuitry is processed and displayed on the monitor. In addition, audio data is processed by the audio processing circuit and provided to the speaker which renders the data audible. To facilitate the video graphics circuitry processing of data, an accelerated graphics port (AGP) bus has been provided to the memory via the chip set. By utilizing the AGP bus, the video graphics circuitry may store and retrieve data from the system memory without intervention from the central processing unit. Similarly, the PCI bus provides access to the system memory for the peripheral devices. Note that the audio processing circuitry may be coupled to the PCI bus to retrieve stored audio data such as synthesized audio data.

In the system of FIG. 4, the CPU and cache memory are typically fabricated on a single integrated circuit. The chip set is fabricated on two or more integrated circuits, while the video graphics circuitry is fabricated on a single integrated circuit and is typically mounted on a separate printed circuit (PC) board. Such an implementation is speed limited, bandwidth limited, and power dissipation limited (i.e., it consumes a substantial amount of power). For example, the transportation of data via the chip set does not run at the CPU rate. In a typical application, the data transference rate is $1/2^n$ of the CPU rate. As such, the CPU often experiences delays when reading from and/or writing to main or system memory.

In addition, the data is transported via IC pins of the central processing unit, the chip set and the memory using TTL signaling technology. As is known, TTL signaling has a power dissipation that increases with the square of the frequency. Thus, a doubling of the frequency quadruples the power dissipation. Since most current CPUs are pushing the power dissipation envelope using a data transference frequency rate that is at most one-half of the CPU rate, increasing the data transference rate to the CPU rate would be impractical due to the quadrupling of the power dissipation.

The system of FIG. 4 is also bandwidth limited due to the impracticality of having a wider data bus. Current central processing units utilize a 64 bit bus. Accordingly, the CPU, the chip set and memory each require 64 pins to accommodate the bus. If a wider bus were desired, for example, 128 bits or 256 bits, each IC would require a corresponding number of pins, which currently is cost and area prohibitive. In addition, by increasing the number of signaling pins, the power dissipation increases accordingly. Thus, a doubling of pins doubles the power dissipation. As previously mentioned, since most current CPUs are pushing the power dissipation envelope, increasing the number of pins would be impractical.

Therefore, a need exists for a computer system that is not bandwidth limited, power dissipation limited or data transference rate limited as are current system architectures.

DETAILED DESCRIPTION OF A PREFERRED EMBODIMENT

Generally, the present invention provides an integrated computing system and method of manufacture thereof. The integrated computing system includes at least one processor formed on a substrate, wherein the processor operates at a processor rate. The integrated computing system further includes a global bus that is coupled to the at least one processor and is formed on the substrate. The global bus supports transactions (e.g., data, operational instructions, and/or control signaling conveyances) at a rate that is equal to or greater than the processing rate. The integrated computing system further includes a device gateway and memory gateway that are operably coupled to the global bus and formed on the substrate. The device gateway provides an interface for at least one device (e.g., internal or external) to the global bus. The memory gateway provides an interface between the global bus and memory. By integrating these components, package pins are not required thus TTL signaling is not required to convey data between them. As such, the power dissipation issues of previous implementations are substantially reduced. By reducing the power dissipation issues, the global bus may be considerably larger than 64 bits of previous implementations. For example, the global bus may have a data bandwidth, or cache line width, of 128 bits, 256 bits, or 512 bits.

Figure 1:
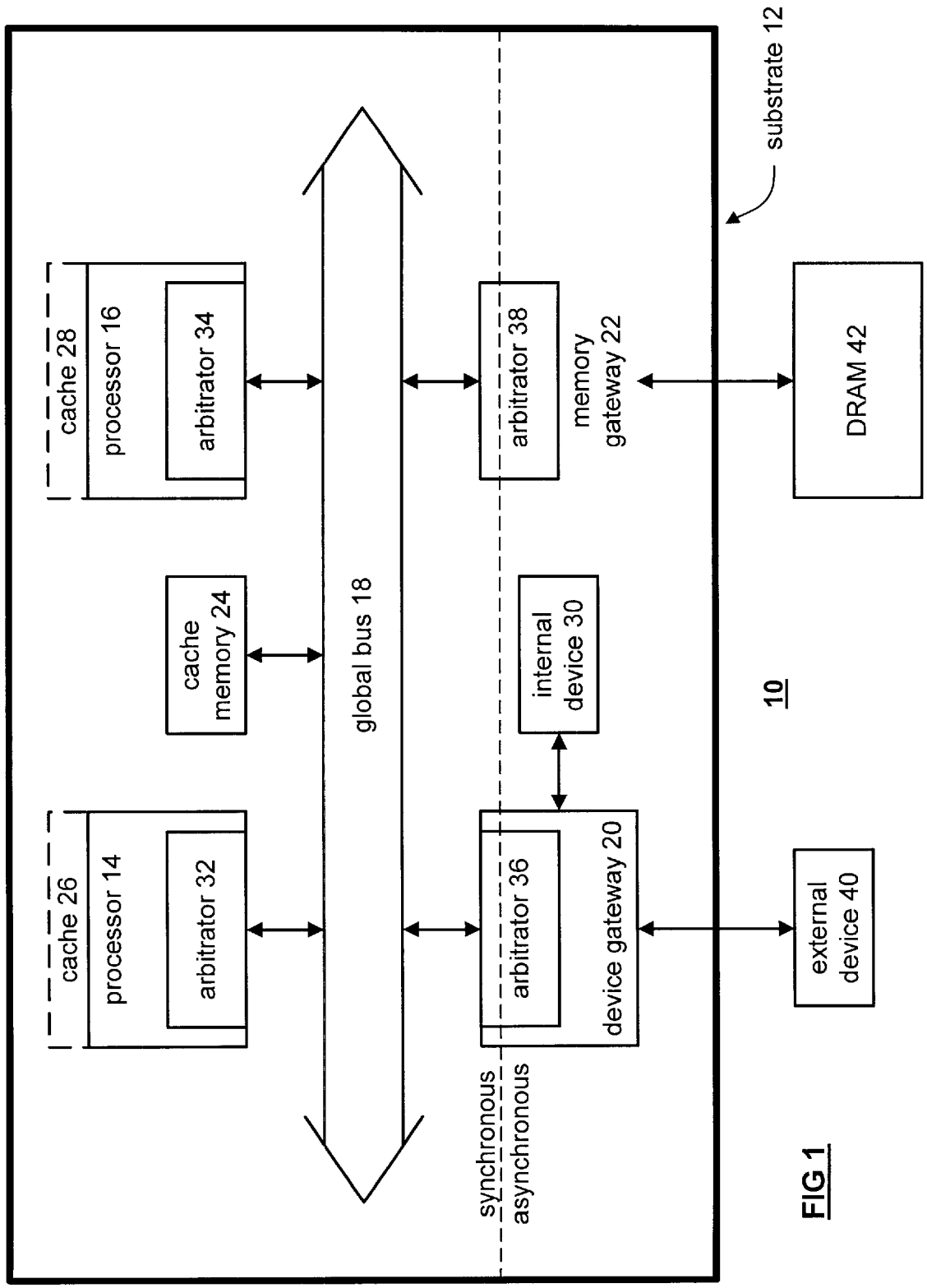
FIG. 1 illustrates a schematic block diagram of an integrated computing system in accordance with the present invention.

The present invention can be more fully described with reference to FIGS. 1 through 3. FIG. 1 illustrates a schematic block diagram of an integrated computing system 10 that includes a substrate 12, at least one external device 40, and memory 42 (e.g., DRAM). Formed on the substrate 12 is a first processor 14, a second processor 16, a global bus 18, a device gateway 20, a memory gateway 22, cache memory 24, and an internal device 30. As one of average skill in the art will appreciate, the components may be formed on the substrate using a deposit fabrication process, an etching fabrication process, or any other technique used to fabricate circuits on a substrate may be used to fabricate the components on substrate 12. Note that the substrate may be a silicon-based substrate, or any other type of substrate used to fabricate integrated circuits.

The processors 14 and 16 may further be formed to include separate cache memories 26 and 28. As one of average skill in the art would appreciate, cache memory 26 and 28 may be omitted and only cache memory 24 may be utilized. Alternatively, cache memory 24 may be omitted and cache memories 26 and 28 may be utilized. For a more further discussion on the sharing of cache memories within the integrated computing system refer to co-pending patent application Ser. No. 09/328,844 entitled "METHOD AND APPARATUS FOR SHARING CACHE MEMORY", which is assigned to the same assignee as the present patent application.

The processors 14 and 16, the device gateway 20, and the memory gateway 22 each include a bus arbitrator 32–38, which provide access to the global bus 18. The bus arbitrators use a distributive arbitration scheme to access the global bus and is done so in a synchronized manner at the processing rate. The distributive arbitration may be initiated via a hardware reset. For a further discussion of the arbitrators 32 and 34 and a portion of arbitrator 36 refer to co-pending patent application Ser. No. 09/377,004 entitled "A METHOD AND APPARATUS FOR INTERFACING A PROCESSOR WITH A BUS." Such arbitrators acting in a master roll push data, instructions, and/or control signals onto the global bus 18. For a discussion of arbitrators that pull data off the bus in a master role, (i.e., the arbitrator 38 and a portion of arbitrator 36) refer to co-pending patent application Ser. No. 09/376,874 and is entitled METHOD AND APPARATUS FOR INTERFACING A BUS WITH INPUT/OUTPUT DEVICES, a filing date equal to the filing date for this application, a serial number of "not assigned", and is assigned to the same assignee as the present patent application. Note that each of the arbitrators 32–38 push and pull data, instructions, and/or controls signals to and from the global bus 18, with the pushing and/or pulling done in a master role (i.e., active initiation) and the other being done in a slave role (i.e., passive recipient).

Processors 14 and 16 may be general purpose processors or dedicated purpose processors. A general purpose processor is one that accepts programming instructions and executes a variety of applications. For example, a general purpose processor may emulate an x86 processor. To achieve the x86 emulation, the memory 42 includes microcode instructions that enable the processor to function as an x86 general purpose processor. Such x86 microcode is stored in a ROM BIOS external to the system on a chip. For a more detailed discussion of an architecture for a general purpose processor refer to co-pending patent application Ser. No. 09/376,830 and is entitled "METHOD AND APPARATUS OF CONFIGURABLE PROCESSING".

If the processor 14 or 16 is a dedicated purpose processor, the processor is performing a particular function such as three-dimensional video graphics, MPEG encoding and decoding, etc. The architecture of a dedicated purpose processor performing 3-D video may be a video graphics circuit as found in ATI International's All-In-Wonder products. Similarly, the architecture of a dedicated MPEG decoding/encoding processor may utilize an existing architecture as found in ATI International's All-In-Wonder products.

The global bus 18 utilizes a pipelining process that operates at the processor rate, which may be 500 megahertz or greater, or may utilize a super-pipelining technique. As is known, super pipelining utilizes two cycles to process related operations, wherein the second operation depends on the result of the first. The global bus may include 128 bit cache line, a 256 bit cache line, or a 512 bit cache line, i.e., data bandwidth. For a more detailed discussion of the global bus 18 refer to co-pending patent application Ser. No. 09/328,971 and is entitled "METHOD AND APPARATUS FOR BUSING DATA ELEMENTS".

The internal device 30 may be at least one of an AC97 audio interface, a display controller, a direct memory access (DMA), a television (TV) encoder, and/or a TV decoder. The TV encoder and/or decoder may process NTSC, PAL and/or SECAM signaling. Such TV encoding and decoding may use similar circuitry as found in ATI International's All-In-Wonder products. As one of average skill in the art will appreciate, the internal device may be any other computer peripheral device that is designed to interface with the CPU and/or memory via the PCI bus.

As shown, the substrate 12 is divided into two sections, one for synchronous operation and another for asynchronous operation. The synchronous operation centers around utilization of the global bus 18. As such, all transactions (e.g., data transfers, instruction retrievals, control signaling, etc.) on global bus 18 are done in a synchronous manner. Such a division enables transactions on the global bus to occur at the processor rate, or at a greater rate. In addition, all transactions on the global bus 18 are addressed using the same address space (e.g., linear addresses or physical addresses).

The device gateway 20 provides an interface between the internal devices 30 and external device 40 and the global bus 18. As shown, the device gateway 20 allows for asynchronous transactions to and from the devices 30 and 40 and accesses the global bus in a synchronous manner. For a detailed discussion of the device gateway, refer to co-pending patent application Ser. No. 09/376,874 and entitled METHOD AND APPARATUS FOR INTERFACING A BUS WITH INPUT/OUTPUT DEVICES, a filing date equal to the filing date for this application, a serial number of "not assigned", and is assigned to the same assignee as the present patent application.

The memory gateway 22 provides an interface between the memory 42 and the global bus 18. As shown, the memory gateway 22 allows for asynchronous transactions to and from the memory 42 and accesses the global bus in a synchronous manner. For a detailed discussion of the memory gateway 22 refer to co-pending patent application Ser. No. 09/376,190 entitled METHOD AND APPARATUS FOR INTERFACING MEMORY WITH A BUS, a filing date equal to the filing date for this application, a serial number of "not assigned", and is assigned to the same assignee as the present patent application.

As one of average skill in the art will appreciate from the discussion of FIG. 1, the integrated computing system overcomes bandwidth limitations, power limitations, and data transference rate limitations of previous implementations by eliminating the need for pin connections and the corresponding TTL signaling. As such, the global bus can operate at or above the processor rate and its bandwidth may be extended to 128 bits, 256 bits, and/or 512 bits without the power dissipation issues of previous implementations. As one of average skill in the art will further appreciate, the integrated computing system 10 may include more or less than two processors and may include a mix of general purpose processors and dedicated purpose processors.

Figure 2:
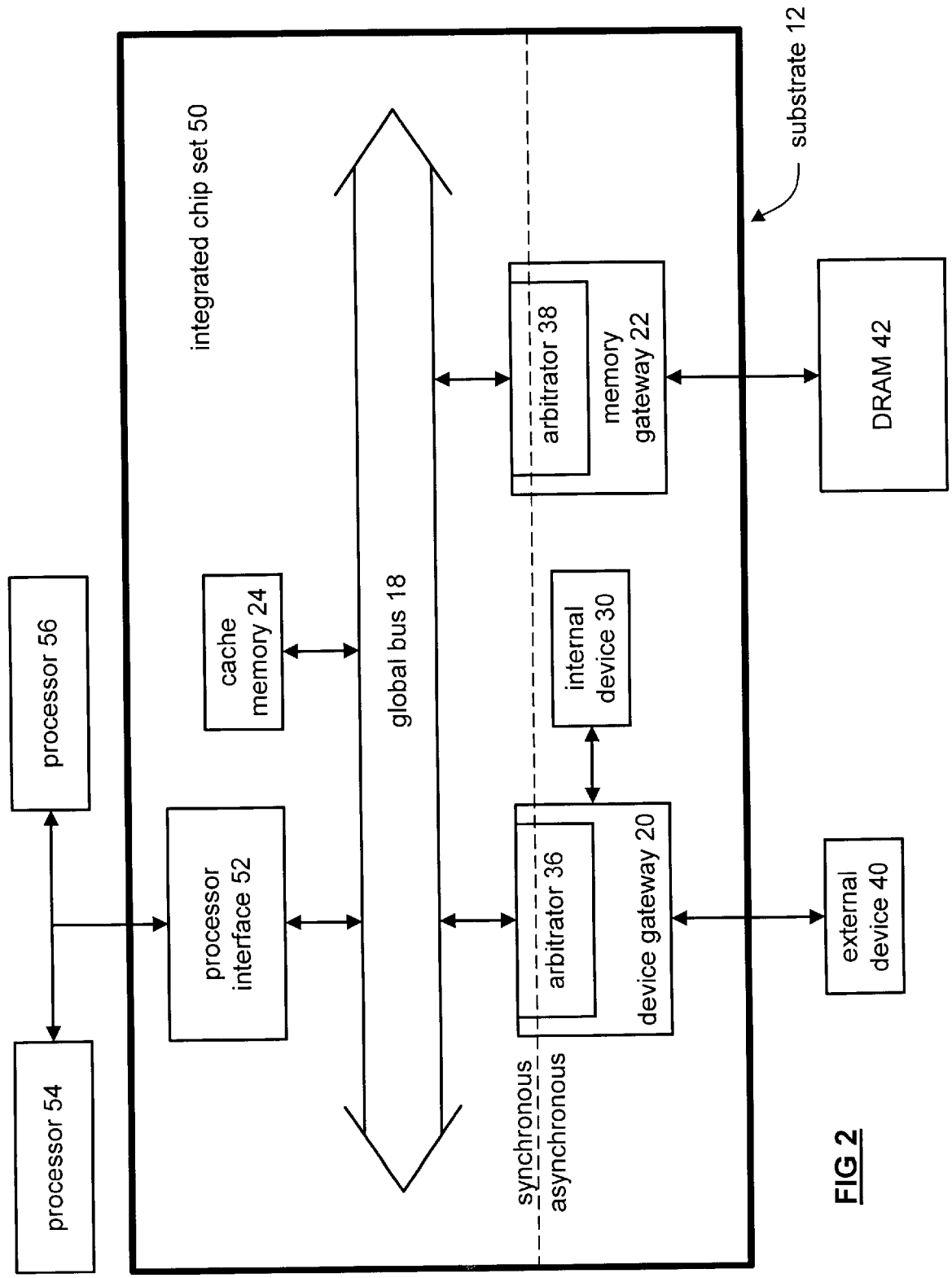
FIG. 2 illustrates an integrated chip set in accordance with the present invention.

FIG. 2 illustrates a schematic block diagram of an integrated chip set. As shown, the integrated chipset 50 includes the global bus 18, cache memory 24, device gateway 20, memory gateway 22 and internal device 30. The integrated chipset 50 further includes a processor interface 52 that allows the integrated chipset 50 to interface with external processors 54 and/or 56. The functionality of the integrated chipset 50 is similar to the integrated computing system 10 except that the processors are external to the integrated chipset 50. The processor interface processor 52 provides coupling of the processors to the global bus 18. The processor interface 52 may utilize known interfacing techniques that are based on TTL signaling.

Figure 3:
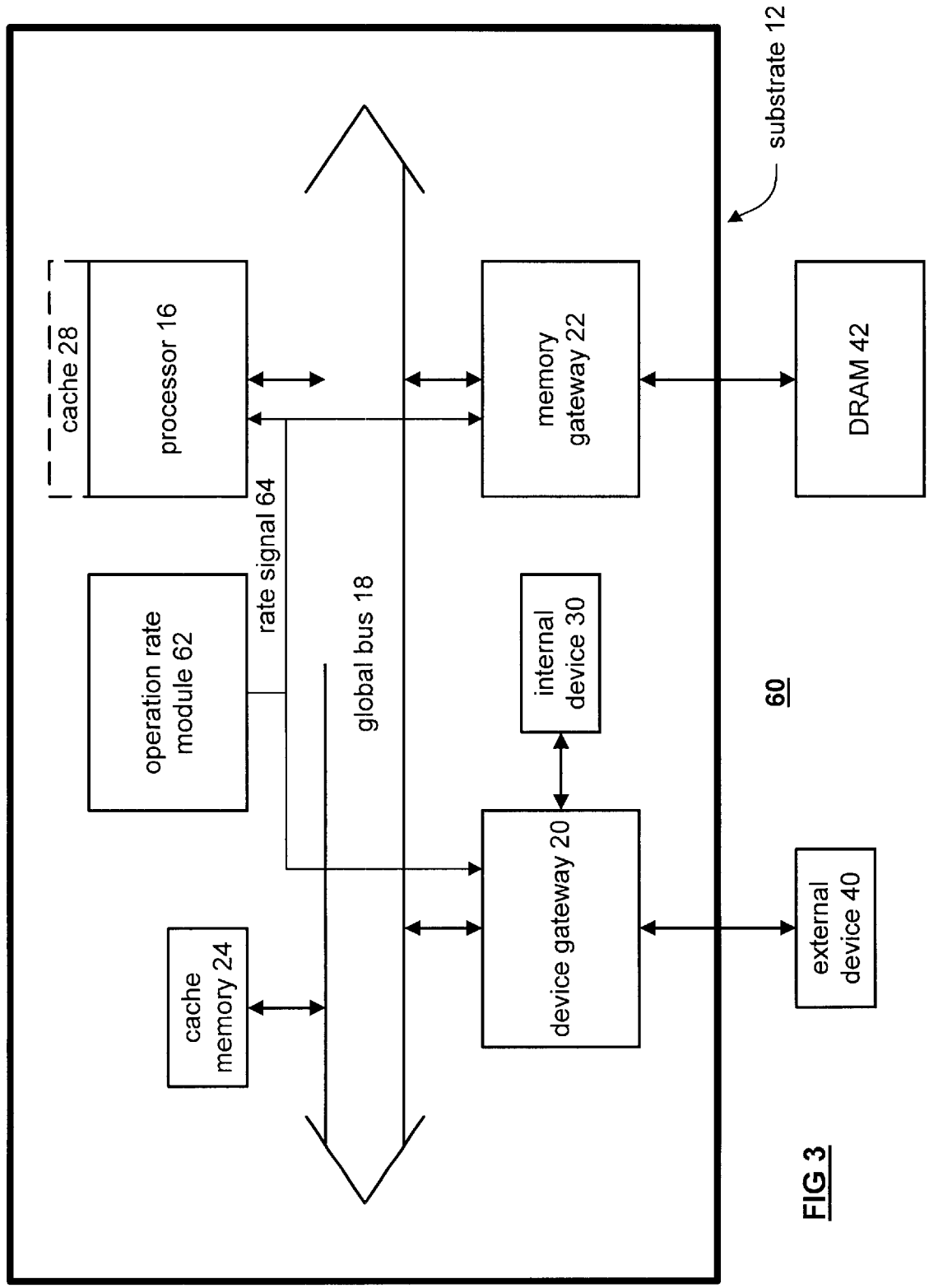
FIG. 3 illustrates a schematic block diagram of an alternate integrated computing system in accordance with the present invention.
Figure 4:
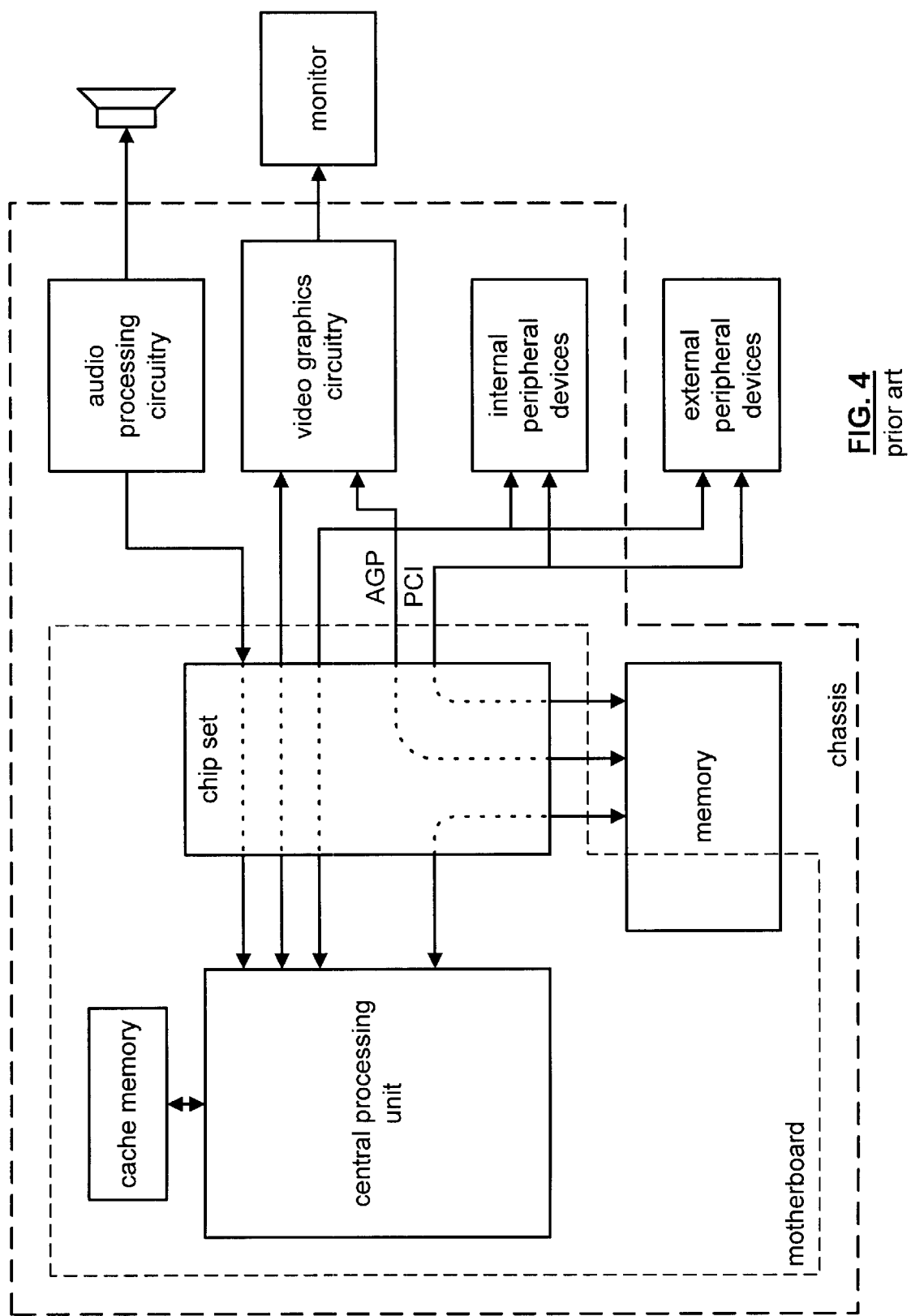
FIG. 4 illustrates a schematic block diagram of a prior art computing system.

FIG. 3 illustrates a schematic block diagram of an alternate computing system 60. The integrated computing system 60 is fabricated on a substrate 12 that includes at least one processor 16, the device gateway 20, the global bus 18, the memory gateway 22, the internal device 30, cache memory 24 and further includes an operation rate module 62. The function of the processor 16, cache memory 24, a global bus 18, device gateway 20, internal device 30, and memory gateway 22 are as discussed with reference to FIG. 1. In this embodiment, the operation rate module 62 generates a rate signal 64 that is provided to the processor 16, device gateway 20, and memory gateway 22. The rate signal indicates the rate at which the global bus 18 will support transactions. The operation rate module 62 may be programmed by a user of the computing system, by the processor, or based on operating system instructions to establish the rate signal. Alternatively, the operation rate module 62 may include an algorithm to determine an appropriate rate for transactions on the bus 18. At a minimum, the rate signal will be at least equal to the processor rate of processor 16. In addition, the operating rate module 62 may include arbitration functionality to replace the arbitrators 32–38 and control access to the bus 18.

The integrated computing system of FIG. 1 or FIG. 3 may be manufactured by forming at least one processor, the global bus, a device gateway on a substrate. The particular technique for forming these circuits on the substrate may be depositing, etching, or any other known or to be determined IC fabrication technique. The processor is fabricated to operate at a processing rate and the global bus is fabricated to have a large data width (e.g., 128 bits to 512 bits) and supports transactions at a rate that is equal to or greater than the processor rate. The device gateway is fabricated to provide an interface for at least one device (internal or external) to the global bus. The memory gateway is fabricated to provide an interface between the global bus and external memory.

The integrated chipset of FIG. 2 may be manufactured by forming the global bus, a processor interface, a device gateway, and a memory gateway on a substrate. The fabrication technique may be depositing, etching, and/or any other known IC manufacturing technique. The global bus is fabricated to support transactions at a rate that is equal to or greater than the processor rate. In addition, the global bus is fabricated to have a large cache line, or data width, e.g., 128 bits to 512 bits. The processor interface is fabricated to provide an interface between the global bus and at least one external processor wherein the processor operates at the processor rate. The device gateway and memory gateway are fabricated as previously discussed.

The integrated computing system of FIG. 1 or FIG. 3 may be fabricated in an alternate method by forming first and second processors, a global bus, a device gateway, a memory gateway, and cache memory on a substrate. These components are fabricated as previously discussed to perform the corresponding functions. Note that by fabricating these elements on a single substrate, the bandwidth limitations, power dissipation limitations, and data rate transference rate limitations are substantially reduced in comparison with discrete component implementations. As such, the integrated computing system may operate with a power dissipation of less than 20 watts and at a processor rate of 500 megahertz or greater with a data bandwidth of 128 bits, 256 bits or 512 bits.

The preceding discussion has described an integrated computing system and method of manufacture thereof. By integrating the components of a computing system as described, bandwidth limitations, power dissipation limitations and data transference rate limitations of prior art systems are substantially reduced.

What is claimed is:

1. An integrated computing system comprises:
   at least one processor formed on a substrate, wherein the processor operates at a processor rate;
   a global bus operably coupled to the at least one processor, wherein the global bus is formed on the substrate, and wherein the global bus supports transactions at a rate that is equal to or greater than the processor rate;
   device gateway operably coupled to the global bus, wherein the device gateway is formed on the substrate, wherein the device gateway provides an interface for at least one device to the global bus; and
   memory gateway operably coupled to the global bus, wherein the memory gateway is formed on the substrate, and wherein the memory gateway provides an interface between the global bus and memory and
   wherein the at least one processor, the memory gateway, and the device gateway each include a bus arbitrator to distributively arbitrate access to the global bus, and the bus arbitrators are synchronous to the processor rate.

2. An integrated computing-system comprises:
   at least one processor formed on a substrate, wherein the processor operates at a processor rate;
   a global bus operably coupled to the at least one processor, wherein the global bus is formed on the substrate, and wherein the global bus supports transactions at a rate that is equal to or greater than the processor rate;
   device gateway operably coupled to the global bus, wherein the device gateway is formed on the substrate, wherein the device gateway provides an interface for at least one device to the global bus; and
   memory gateway operably coupled to the global bus, wherein the memory gateway is formed on the substrate, and wherein the memory gateway provides an interface between the global bus and memory,
   wherein the distributed arbitration is initiated by a hardware reset.

3. An integrated computing system comprises:
   at least one processor formed on a substrate, wherein the processor operates at a processor rate;
   a global bus operably coupled to the at least one processor, wherein the global bus is formed on the substrate, and wherein the global bus supports transactions at a rate that is equal to or greater than the processor rate;

device gateway operably coupled to the global bus, wherein the device gateway is formed on the substrate, wherein the device gateway provides an interface for at least one device to the global bus; and memory gateway operably coupled to the global bus, wherein the memory gateway is formed on the substrate, and wherein the memory gateway provides an interface between the global bus and memory, wherein the interface provided by the memory gateway to the memory and the interface provided by the device gateway are asynchronous to the processor rate.

4. An integrated chip set comprises:

a global bus formed on a substrate, wherein the global bus supports transactions at a rate that is equal to or greater than a processor rate;

a processor interface formed on the substrate, wherein the processor interface provides an interface to at least one processor that operates at the processor rate;

device gateway operably coupled to the global bus, wherein the device gateway is formed on the substrate, wherein the device gateway provides an interface for at least one device to the global bus; and memory gateway operably coupled to the global bus, wherein the memory gateway is formed on the substrate, and wherein the memory gateway provides an interface between the global bus and memory, wherein the processor interface, the memory gateway, and the device gateway each include a bus arbitrator to distributively arbitrate access to the global bus, and the bus arbitrators are synchronous to the processor rate.

5. An integrated computing system comprises:

a first processor formed on a substrate;

a second processor formed on the substrate;

a global bus operably coupled to the at least one processor, wherein the global bus is formed on the substrate to support transactions at a rate equal to or greater than the rate of said first processor and said second processor;

device gateway operably coupled to the global bus, wherein the device gateway is formed on the substrate, wherein the device gateway provides an interface for at least one device to the global bus;

memory gateway operably coupled to the global bus, wherein the memory gateway is formed on the substrate, and wherein the memory gateway provides an interface between the global bus and memory; and cache memory operably coupled to the global bus, wherein the cache memory is shared by the first and second processors, wherein the first and second processors, the memory gateway, and the device gateway each include a bus arbitrator to distributively arbitrate access to the global bus, and the bus arbitrators are synchronous to the processor rate.

6. The integrated computing system of claim 5, wherein the interface provided by the memory gateway to the memory and the interface provided by the device gateway are asynchronous to the processor rate.

7. An integrated computing system comprises:

at least one processor formed on a substrate;

a global bus operably coupled to the at least one processor, wherein the global bus is formed on the substrate;

device gateway operably coupled to the global bus, wherein the device gateway is formed on the substrate, wherein the device gateway provides an interface to at least one device at a device rate;

memory gateway operably coupled to the global bus, wherein the memory gateway is formed on the substrate, and wherein the memory gateway provides an interface to memory at memory rate; and operation rate module operably coupled to the at least one processor, the device gateway, and the memory gateway, wherein the operation rate module provides a rate signal to the at least one processor, the device gateway, and the memory gateway such that the global bus supports transactions at the rate signal, and wherein the rate signal is asynchronous to the device rate and the memory rate.

8. The integrated computing system of claim 7, wherein the at least one processor includes at least one of: a general purpose processor and a dedicated purpose processor.

9. The integrated computing system of claim 7, wherein the at least one processor, the memory gateway, and the device gateway each include a bus arbitrator to distributively arbitrate access to the global bus.

10. The integrated computing system of claim 7 further comprises a cache memory formed on the substrate, wherein the cache memory is operably coupled to the global bus.

11. The integrated computing system of claim 7, wherein the memory includes at least a portion of micro code that enables the at least one processor to function as a general purpose processor.

12. A method of manufacturing an integrated computing system, the method comprises the steps of:

forming at least one processor on a substrate;

forming a global bus on the substrate to be operably coupled to the at least one processor;

forming a device gateway on the substrate to be operably coupled to the global bus, wherein the device gateway provides an interface to at least one device at a device rate;

forming a memory gateway on the substrate to be operably coupled to the global bus, wherein the memory gateway provides an interface to memory at memory rate; and forming an operation rate module on the substrate to be operably coupled to the at least one processor, the device gateway, and the memory gateway, wherein the operation rate module provides a rate signal to the at least one processor, the device gateway, and the memory gateway such that the global bus supports transactions at the rate signal, and wherein the rate signal is asynchronous to the device rate and the memory rate.

13. The method of claim 12 further comprises forming cache memory on the substrate to be operably coupled to the global bus such that the cache memory is shared by the at least one processor.

14. The method of claim 12 further comprises forming the at least one processor to be at least one of: a general purpose processor and a dedicated purpose processor.

* * * * *